United States Patent [19]

Coulon et al.

[11] Patent Number: 5,362,468

[45] Date of Patent: Nov. 8, 1994

[54] PROCESS FOR THE PYROLYSIS OF FLUID EFFLUENTS AND CORRESPONDING APPARATUS

[75] Inventors: Michel Coulon, Montmorency; Jacques Boucher, Argenteuil, both of France

[73] Assignee: Le Carbone Lorraine, Courbevoie, France

[21] Appl. No.: 4,615

[22] Filed: Jan. 14, 1993

[30] Foreign Application Priority Data

Jan. 22, 1992 [FR] France .................................. 92 00847

[51] Int. Cl.$^5$ .............................................. C01B 31/00
[52] U.S. Cl. .................................. 423/445 R; 588/206
[58] Field of Search ......................... 588/206; 423/445; 208/78

[56] References Cited

U.S. PATENT DOCUMENTS

4,447,667  5/1984  Parker et al. ........................ 588/206
4,810,357  3/1989  Chester et al. ......................... 208/78
5,124,023  6/1992  Bosserman et al. .................. 208/108

Primary Examiner—Gary P. Straub
Assistant Examiner—Stephen G. Kalinchak
Attorney, Agent, or Firm—Dennison, Meserole, Pollack & Scheiner

[57] ABSTRACT

The pyrolysis process for fluid effluents in an enclosure, where they are transformed into solid and gaseous products is characterized in that the said effluents are heated on contact with solid elements, on traversing a pile of said solid elements offering a surface contact per volume unit at least equal to 10 m/m and in that the said solid products are trapped on the surface of said solid elements and are then separated from the latter, so as to be able to regenerate the said solid elements. Continuous or discontinuous pyrolysis apparatus for performing the process according to the invention. Application to the destruction of chlorinated effluents.

16 Claims, 6 Drawing Sheets

PROCESS FOR THE PYROLYSIS OF FLUID EFFLUENTS AND CORRESPONDING APPARATUS

FIELD OF THE INVENTION

The invention relates to a process for the pyrolysis of fluid effluents and to an apparatus for performing the process.

PRIOR ART

U.S. Pat. No. 4,982,039 discloses a process for the pyrolytic conversion of halogenated organic compounds into hydrogen halide by pyrolyzing said organic compounds in a reducing atmosphere.

Moreover, EP-A-235473 describes a process for the destruction of chlorinated organic waste, more particularly PCB (polychlorobiphenyls), in which the waste is injected into a burner supplied with oxygen and hydrogen, in the presence of water, so as to carry out steam cracking in the combustion chamber.

Finally, EP-A-90148 describes a process for the pyrolytic decomposition or combustion of toxic and possibly radioactive waste, in which the waste is treated in a heated reactor containing a bed of mechanically agitated granules circulating within said bed.

SET PROBLEM

The treatment of effluents and in particular toxic effluents is becoming a major concern for industrial companies. In addition, the actual treatment processes must satisfy ever-increasing demands, both as regards the products formed during the treatment, the general economic aspects of the processes involved (size of the installations, ease of performing the processes, consumption of products or energy, etc.), or more particularly the universal nature and flexibility of use permitting the treatment of a wide range of effluents, because all effluents cannot be treated under the same conditions and in particular not at the same temperature.

In this connection, the prior art processes do not satisfy all these criteria, particularly incineration processes which lead to the formation of very large $CO_2$ quantities.

In particular, the prior art pyrolysis processes do not deal in a satisfactory manner with the problem of discharging the solid products formed during pyrolysis, which is highly prejudicial to the efficiency and economic aspects of the process (dirtying of the apparatus, heat transfer losses, rapid drop in pyrolysis efficiency, etc.).

OBJECT OF THE INVENTION

A first object of the invention is a process for the pyrolysis of fluid effluents, which solves the problems indicated hereinbefore and which meets the following requirements:

the products formed through the performance of the process must either be valorizable in themselves, or non-toxic and in particular said products contain little or preferably no $CO_2$, unlike effluent treatment processes based on consumption in the presence of oxygen (incinerators);

the process according to the invention consumes little energy and virtually no consumable materials;

the process according to the invention can operate under stationary or quasi-stationary or steady-state condition;

finally, the process according to the invention can operate at various temperatures, consequently having a high flexibility of use and operation, particularly for the treatment of fluid effluents of various natures.

A second object of the invention is a pyrolysis apparatus for performing the process of the invention and which is very compact.

Finally, a third object of the invention is a complete unit incorporating said pyrolysis apparatus.

DESCRIPTION OF THE INVENTION

The invention therefore relates to a process for the pyrolysis of fluid effluents involving the introduction of said effluents into a pyrolysis enclosure, the heating of said effluents at a temperature where they are transformed into solid and gaseous products, the discharge of said solid and gaseous products from said enclosure, characterized in that the said effluents are heated to said transformation temperature on contact with a plurality of solid elements raised to a temperature above the said transformation temperature, passing through a pile of said solid elements offering a contact surface per volume unit at least equal to 10 $m^2/m^3$ and in that said solid products formed by the transformation of said effluents are trapped on the surface of said solid elements during said transformation and then separated from said solid elements following said transformation, so as to regenerate said solid elements.

DETAILED DESCRIPTION OF THE INVENTION

Figure 1:
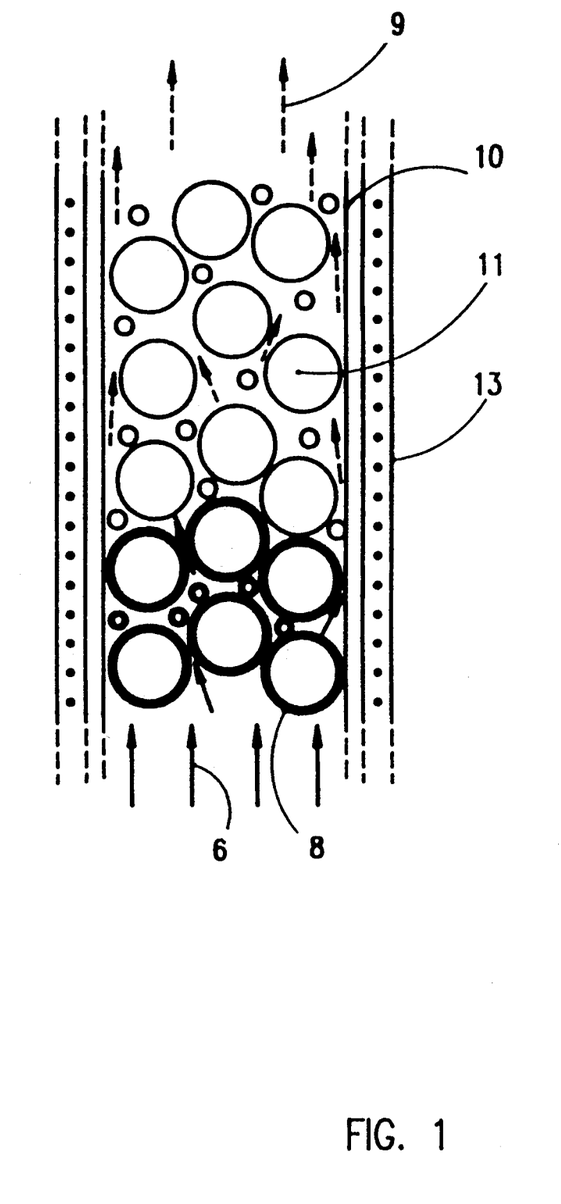
FIG. 1 is a longitudinal section of part of the enclosure (10) of a pyrolysis apparatus (2), containing solid elements (11) heated by an induction coil (13). The fluid effluents (6) to be pyrolyzed are represented by continuous line arrows, whilst the gaseous products formed (9) are represented by broken line arrows and the solid products formed (8) constitute a deposit on the surface of the fluid elements (11).

Thus, the process is based on the passage of the fluid effluents to be treated through a pile or stack of solid elements raised to an adequate temperature to bring about the desired transformation and in general a pyrolytic decomposition or pyrolysis. In general terms, solid products are formed and trapped on the surface of the solid elements and gaseous products are formed, which are discharged from the enclosure. FIG. 1 illustrates what takes place at the start of the performance of the process. As solid products are formed in the enclosure during the transformation of the effluents, by the covering of said solid elements with a layer of solid products, it is necessary to discharge from the enclosure the solid products and to regenerate said solid elements, which can take place in either a continuous, or a discontinuous manner, as will be described hereinafter.

It is preferable for the purpose of obtaining a uniform temperature in the enclosure, that said solid elements are in themselves heat flow emitters and not heat flow absorbers, as would e.g. be the case if the solid elements were heated by radiation from the wall of said enclosure raised to a very high temperature. Thus, it is preferable that there is a slight positive thermal gradient between said solid elements and the wall of the enclosure, the solid elements being at a higher than the enclosure wall.

One of the essential problems to be solved in a pyrolysis process is the obtaining of stable operating conditions, without any drift in time, which presupposes that there is no deterioration or dirtying of the surfaces in contact with the effluents to be treated or with the solid or gaseous products formed during pyrolysis.

In this respect, the Applicant has observed that a positive thermal gradient was very advantageous compared with the case of a negative thermal gradient (heating of the solid elements by an enclosure wall raised to a higher temperature). On the one hand the thermal efficiency is higher and in particular said efficiency remains stable throughout the performance of the process. Thus, contrary to what happens with a negative gradient, the thermal efficiency and therefore the pyrolysis efficiency is not very sensitive to the deposition of solid product on the solid elements.

In order to obtain this positive thermal gradient and heat said solid elements to above said transformation temperature, the Applicant has made use of per se known heating methods, namely heating by induction or by electrical conduction (Joule effect) and consequently by choosing solid elements which are at least part conductive under the conditions of use. Preferably, the solid elements are heated by induction.

Moreover, the solid elements, like the enclosure wall must satisfy other requirements, which may be the resistance of the material to very high temperatures above 2000° C., where it is necessary to use materials having very good refractory characteristics, or the resistance to corrosion or abrasion, or mechanical characteristics, particularly a resistance to dirtying in the case of the solid elements.

In order to satisfy all these requirements, the solid elements preferably have a composite structure and are typically constituted by two different materials, one being an electrically conductive material which forms the central core of the solid element and the other a refractory material constituting an outer layer forming a covering for said core and typically ensuring a resistance to corrosion and attrition, whilst also facilitating the subsequent elimination of deposits of solid products formed. Such a solid element with a composite structure is used with induction heating. However, as a function of the nature of the fluid effluents to be treated and in general under more severe operating conditions, it is possible to use solid elements made from said electrically conductive material.

Preferably the electrically conductive material of said solid elements is graphite, refractory metals, conductive materials chosen from among carbides, silicides or borides of metals. The refractory material forming the outer layer of the central core, in the case of a solid element having a composite structure, is chosen from among graphite, refractory metals, conductive or insulating ceramics chosen from among oxides, carbides, nitrides, silicides or borides of metals.

According to the invention, the solid element with the composite structure is constituted by two parts, the central core and its outer layer, each being formed by different materials, so that each material can fulfil a specific function in accordance with the nature of the fluid effluents to be treated.

With the aid of exploratory tests, it is particularly important to choose a refractory material forming said outer layer, which is appropriate for the nature of the solid element formed during pyrolysis, so that the solid product formed during pyrolysis and deposited on the surface of said refractory material outer layer can easily be separated from the solid element, so as to be able to regenerate solid elements substantially free from any solid product deposit.

Although the shape of said solid elements can be of a random nature, it is advantageous for them to be spherical, so as to have the best possible mechanical resistance and form a stack or pile offering, to the passage of the fluid effluents, an adequate contact surface and forming a type of automatically reproducible pile.

Preferably, the solid elements are balls with a diameter between 10 and 150 mm, which makes it possible to simultaneously have a large heat exchange surface of at least 10 $m^2/m^3$ and a circulation of fluid effluents and gaseous products with a small pressure drop.

In the case of solid elements with a composite structure, the outer layer, integral with the central core, preferably has a thickness between 0.1 and 2 mm. As said layer fulfils a function linked more with its surface than with its volume, it is sufficient to have at least the necessary thickness to ensure that the solid elements have a reasonable life. Preferably and in particular when said solid product is carbon, use is made of a composite solid element having the shape of a ball with a central graphite core and an outer silicon carbide layer forming a covering.

With regards to the enclosure, it is typically tubular and is made from a refractory material, or is internally coated with a refractory material chosen from among silicon carbide, alumina, reinforced alumina, carbon-carbon composites coated with silicon carbide and concrete.

The performance of the process and in particular the regeneration of the solid elements can take place in two particular ways, namely either discontinuously (batchwise), or continuously.

In the batch process, the solid elements are fixed and form a fixed pile in the enclosure during the transformation of the fluid effluents. Preferably, use is made of two enclosures in alternating manner, so as to be able to eliminate the solid products deposited on said solid elements from a first stopped enclosure, whilst a second enclosure is operating.

In order to eliminate the deposited solid products, use can be made of different methods, namely the mechanical treatment of the solid elements by agitation or stirring, the creation of shocks inside or outside the enclosure, so as to separate the deposited solid products. In the case where the solid product formed is carbon, it is technically possible to burn it, either directly within said enclosure, or outside the latter but, as has been stated, this is not preferred for ecological reasons (reduction of the $CO_2$ content in the atmosphere).

In the continuous process, said solid elements are mobile in the enclosure, but form a stationary stack therein during the transformation of the fluid effluents. In this case, solid elements are introduced into said enclosure at one end of the stack and from said enclosure, namely at the other end of the stack, are removed solid elements charged with said solid products, so as to maintain stationary the volume of the pile and so as to ensure that the solid elements have a predetermined average residence time. The fluid effluents can flow either in the same direction as the solid elements, or in countercurrent manner. The continuous process is preferred according to the invention.

The solid elements are generally heated within the actual enclosure, preferably by induction, but it may be advantageous to separate the heating of the solid elements and the transformation of the fluid effluents. Thus, according to the invention, it is possible to introduce into said enclosure preheated solid elements, i.e. which have been heated outside the pyrolysis enclosure, so that the solid elements retain, bearing in mind their specific heat and their initial temperature, a temperature which is significantly above the transformation temperature whilst they are in the enclosure.

According to the invention, the transformation temperatures are, as a function of the nature of the fluid effluents, between 600° and 2600° C., whereby the solid elements can be raised to temperatures of typically 700° to 3000° C.

Bearing in mind the diversity of the fluid effluents which may be treated by the process according to the invention, it can be advantageous to introduce into the pyrolysis enclosure a non-oxidizing steam or gas with a view to modifying said transformation of the fluid effluents and thus aid the formation of a particular gaseous or solid product, or avoid the formation of an undesirable chemical compound.

Thus, in the case of the pyrolysis of PCB with an empirical formula $C_{12}H_5Cl_5$, the pyrolysis corresponds to the reaction:

$C_{12}H_5Cl_5 \rightarrow 12\ C + 5\ HCl$.

Carbon is deposited on the solid elements and gives off HCl, which is recovered at the outlet of the pyrolysis enclosure.

However, for example in the case of a fluid effluent to be treated in which the Cl/H ratio is below 1, it may be desirable to introduce hydrogen into the enclosure in order to obtain a satisfactory HCl conversion.

Another object of the invention is a pyrolysis apparatus for performing the process of the invention and which comprises at least one refractory material enclosure containing a pile of solid elements, heating means for said solid elements, means for supplying the enclosure with fluid effluents, means for discharging said solid products and also said gaseous products.

Preferably, the pyrolysis apparatus comprises an enclosure into which said solid elements are introduced at one end of the pile during pyrolysis, whereas the solid elements charged with said solid products are extracted from said enclosure at the other end of the pile, so that the elements are displaced within the pile, whilst maintaining the latter in a stationary state and so as to ensure a predetermined residence time of said elements in said enclosure, as a function of the deposition rate of the solid products on the solid elements. In such an apparatus, the solid elements charged with the solid products are treated outside the enclosure, so as to separate the solid products from the solid elements and so as to be able to reintroduce the regenerated solid elements into the enclosure.

However, the pyrolysis apparatus may also comprise two enclosures operating in alternating manner, so as to be able to regenerate said solid elements from a stationary enclosure, whilst the other enclosure is operating.

No matter what type of apparatus is used, i.e. with one or two enclosures, it always has means for regenerating the said solid elements. As stated, mechanical means for separating the solid products from the solid elements are preferable to the combustion of the solid product, when the latter is carbon.

Another object of the invention is a pyrolysis unit incorporating a pyrolysis apparatus of the type described hereinbefore, a gasification device supplying said pyrolysis apparatus with fluid effluents and a treatment device for said gaseous products leaving the pyrolysis apparatus, whereby said treatment can consist of a reaction of said gaseous products with at least one other chemical product.

The effluents to be treated are rarely entirely in the form of fluid effluents. However, in this case, the gasification device is reduced to an injector and a heat exchanger, so as to gasify any liquids and raise the fluid effluents in the gaseous state to a temperature slightly below the transformation temperature before introducing them into the said enclosure.

In the most frequently encountered case, where solids or heavy liquids, such as oils are present in the effluents to be treated, it is possible to use known gasification devices, or that according to the invention as described in example 4.

EXAMPLES

Example 1

Figure 2:
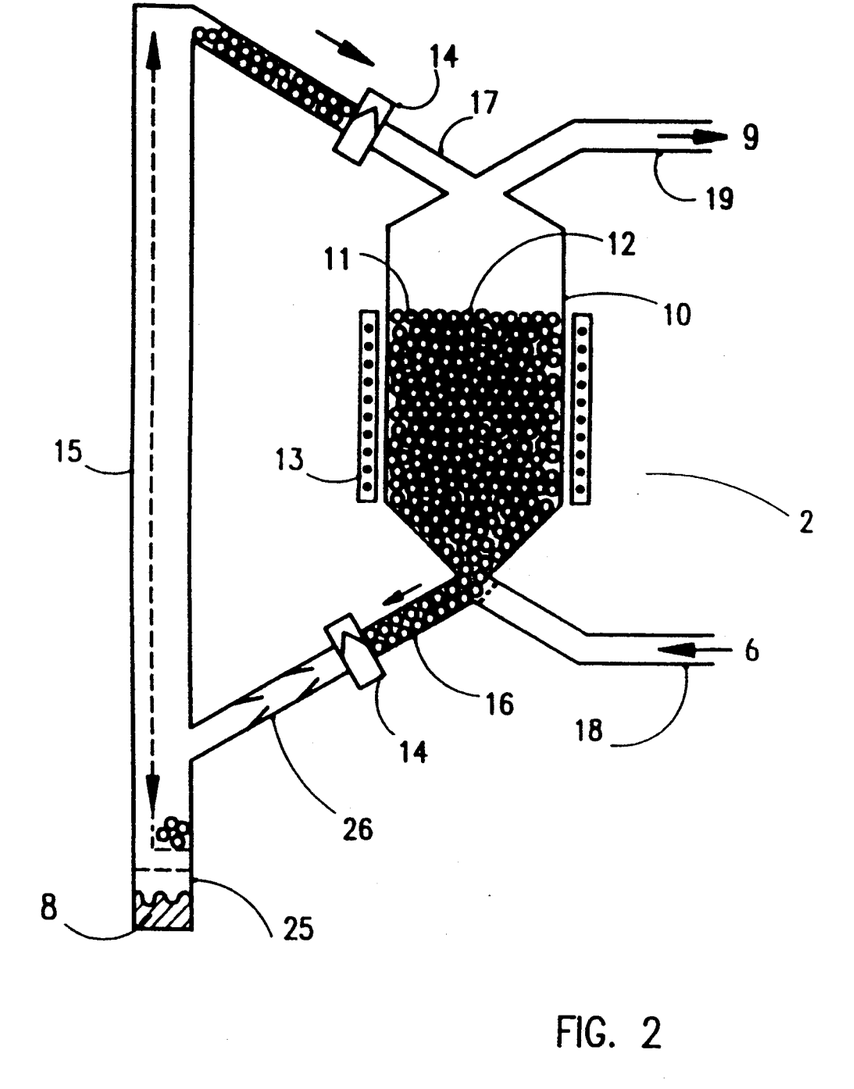
FIG. 2 shows in longitudinal sectional form the pyrolysis apparatus (2) of example 1 according to the invention for performing the continuous pyrolysis process according to the invention.
Figure 7:
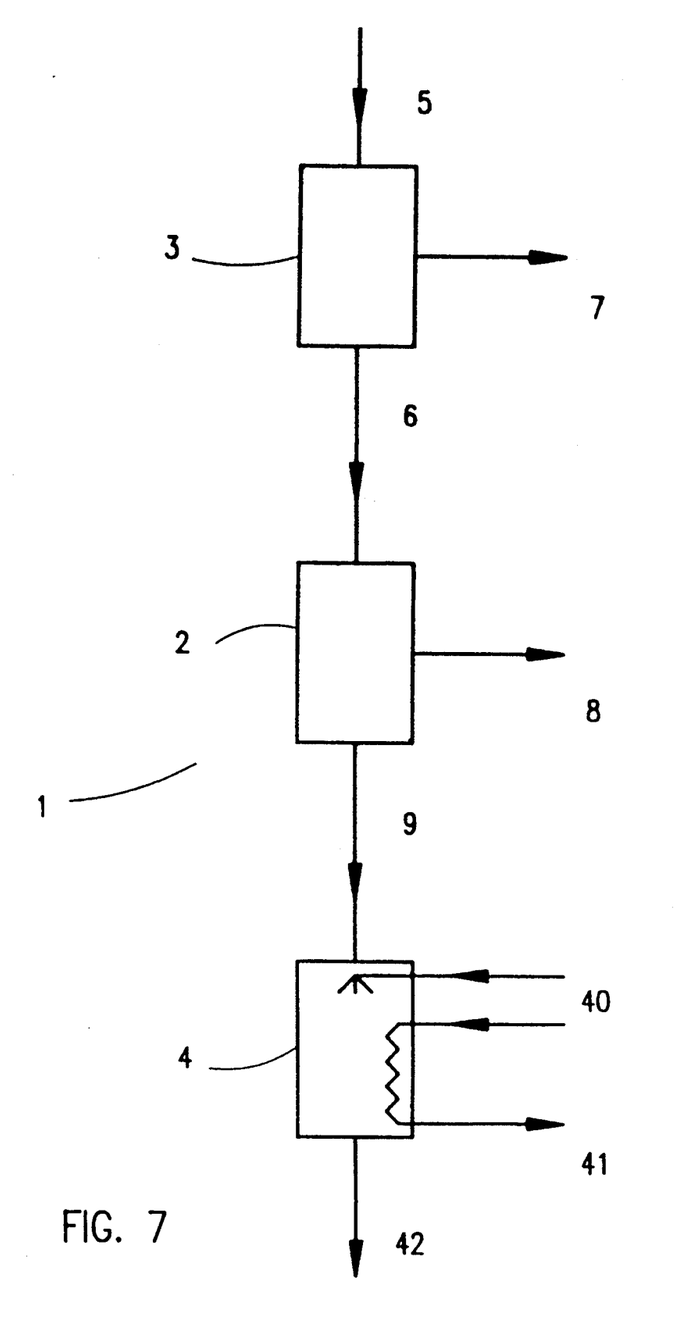
FIG. 7 shows a complete pyrolysis unit for the treatment of chlorinated residues.

This example describes a first continuous pyrolysis process and apparatus according to the invention, said apparatus being diagrammatically illustrated in FIGS. 2 and 7. The apparatus 2 comprises:

a. A cylindrical enclosure (10) containing solid elements (11) forming a pile (12) and provided with induction heating means (13), so as to heat the entire cylindrical portion of the pile.

b. At the lower end of the enclosure (10) and terminated by a grating, a pipe (18) for introducing the fluid effluents (6) from the gasification device (3) and a pipe (16) for discharging the solid elements to be regenerated, because they contain solid products.

c. At the upper end of the enclosure (10), there is a pipe (17) for the introduction of the regenerated solid elements (11), i.e. having a surface free from solid products and a pipe (19) for discharging gaseous products (9) directed towards a treatment device (4), which also sucks the gaseous products and therefore ensures the flow of fluid effluents through the pile (12) of solid elements (11).

d. There are ancillary means, isolated from the enclosure (10) by locks (14), permitting the separation of the solid products (8) and the recycling of the solid elements. Thus, the pipe (16) for the discharge of the solid elements to be regenerated has means, typically in the form of silicon carbide knives (26), for delaminating the solid elements (11) and separating the solid products (8). The discharge pipe (16) issues into the base of a column (15) terminating at its lower end in an ash-receptacle (25) surmounted by a grating, so as to carry out the separation between the solid product (8) in the pulverulent state and the solid elements (11), which are wholly or partly regenerated. The column (15) is provided with means, typically in the form of a mechanical elevator, for bringing about the circulation of the solid elements (11) and for raising them in such a way that they can be introduced by the pipe (17) at the upper end of the enclosure (10).

In said column (15) the regeneration of the solid elements (11) can continue, either by contacts and shocks undergone by the solid elements (11), or optionally by oxidizing the solid products remaining on the surface of the solid elements in the case where carbon has been deposited, but, as stated, the process according to the invention preferably avoids the formation of $CO_2$. According to other variants, the column can be equipped with a rotary drum for facilitating the mechanical cleaning of the solid elements (11) and can also be equipped, preferably at the top of the column, with a space for storing the regenerated solid elements on said enclosure.

e. Means, which are not shown in FIG. 2, in order to ensure the continuous operation and regulation of the complete apparatus and in particular means for actuating the various locks (14), which separate the enclosure (10) and the column (15), so as to regulate the height of the pile (12), the flow rate of the solid elements (11) and the induction heating power as a function of the flow of fluid elements to be treated, such a flow not necessarily being constant.

In the pyrolysis process using this apparatus, the operating conditions generally remain stationary, particularly the height of the pile (12) and the transformation temperature and are chosen in such a way that all the fluid effluents are transformed into solid and gaseous products.

However, the apparatus according to the invention makes it possible to adapt the height of the pile (12) to the charge of fluid effluents to be treated. In this case, the heating means (13) are modified as a function thereof (reduction or increase in the number of induction coils).

The continuous process of example 1 can be deduced from the description of the apparatus of example 1 already given. In stationary or steady-state operating conditions, the pyrolysis enclosure (10) is the location of a double countercurrent flow, on the one hand a rising flow of fluid effluent (6) introduced at the base of the enclosure (10), which progressively disappear to give rise to gaseous products (9) discharged by the pipe (19) at the upper end of the enclosure (10), and on the other hand a downward flow of solid elements (11) progressively charged with solid products resulting from the transformation of the fluid effluents. The speed of these two flows is regulated, as is the temperature of the solid elements (11), so as to ensure a virtually total transformation of the fluid effluents.

EXAMPLE 2

Figure 3:
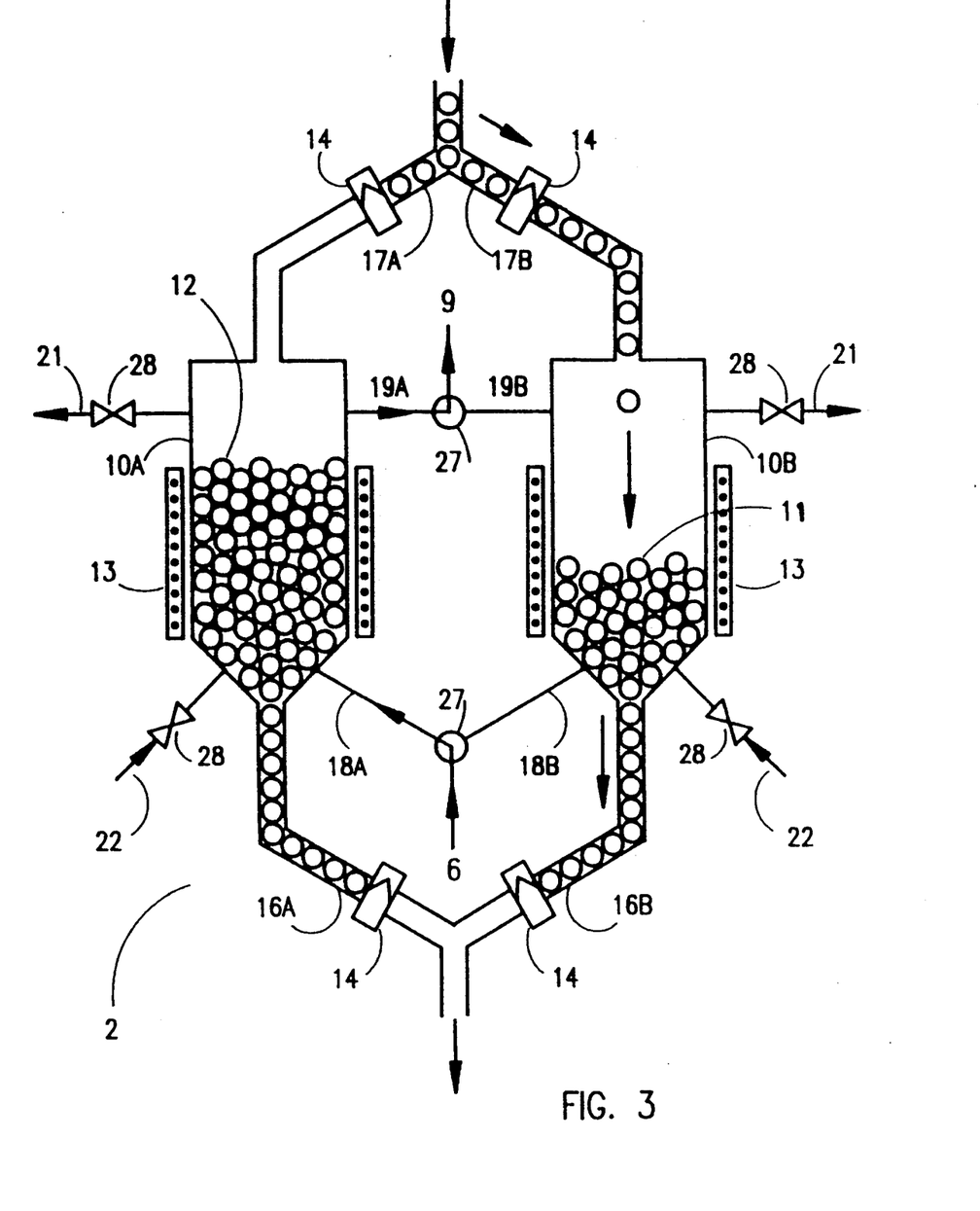
FIG. 3 shows in longitudinal section the pyrolysis apparatus (2) of example 2 according to the invention for the discontinuous or batchwise performance of the process according to the invention.
Figure 4A:
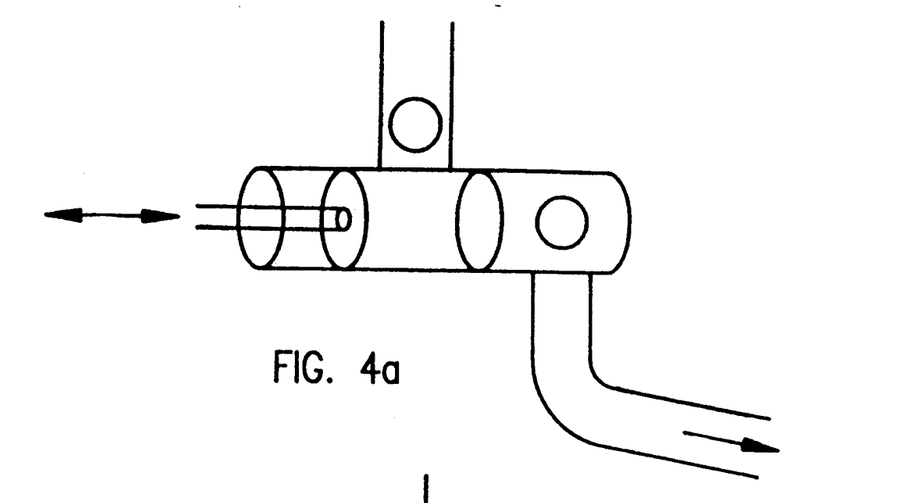
FIG. 4a shows in section and FIG. 4b in perspective two types of lock (14) for solid elements (11).
Figure 4B:
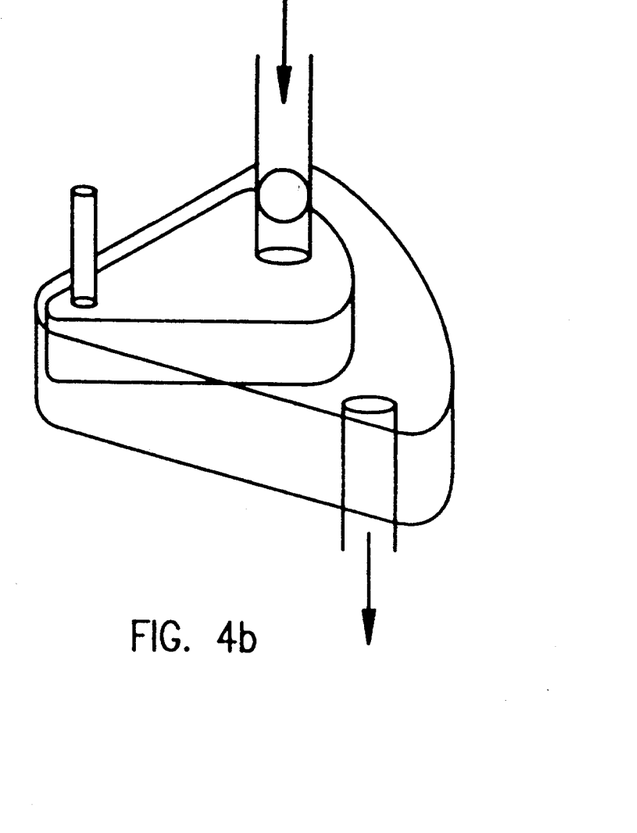

In this example a description is given of a second discontinuous or batch pyrolysis process and apparatus according to the invention, as diagrammatically shown in FIG. 3. Identical means and functions have been designated in the same way as in FIGS. 2 and 3, as well as in the other drawings.

This apparatus essentially comprises two identical enclosures (10A, 10B), but which operate in alternating manner, an operating enclosure (10A) containing solid elements (11) forming a pile (12), pyrolyzes the fluid effluents, whilst the other stopped enclosure (10B) is used for regenerating the solid elements (11).

Each of the two enclosures is equipped with a heating means (13) and provided with the same pipes as the enclosure of example 1. Thus, in the case of the configuration of FIG. 3 there is a pipe (16B) for removing the solid elements to be regenerated at the base of the stopped enclosure (10B), a pipe (17B) for introducing regenerated solid elements into the upper part of the stopped enclosure (10B), a pipe (18A) for supplying the operating enclosure (10A) with fluid effluents (6), a pipe (19A) for discharging the gaseous products (9) formed at the upper part of the operating enclosure (10A).

FIG. 3 does not show the means for regenerating and circulating the solid elements, because they are identical to those of example 1.

However, FIG. 3 does show the possibility of introducing a gas into the enclosures (10A, 10B) with the aid of the pipes (22) and the discharge of a gas from the enclosure by the pipes (21). As stated, such a gas can be introduced into the operating enclosure in such a way as to favour the transformation of the fluid effluents into preferred gaseous products. However, if it is e.g. wished to carry out an oxidizing cleaning of the solid elements (11) in the enclosure (10B), which is not in operation, it is possible to introduce air or oxygen into said enclosure. Such an oxidizing cleaning is preferably only used for eliminating carbon residues deposited on the said solid elements (11), after the separation of most of the solid products formed by mechanical regeneration of said solid elements.

The batch process of example 2 can be deduced directly from the description given of the corresponding apparatus. It is advantageous to perform the process of example 2 in such a way as not to have to interrupt the flow of fluid effluents (6). For this purpose, using bypass valves (27), simultaneous reorientation takes place of the flows of fluid entering and leaving, so as to ensure an alternating operation of the pyrolysis enclosures (10) without any interruption of the supply of fluid effluents (6).

EXAMPLE 3

This example describes the pyrolysis of chlorinated residues of PCB ($C_{12}H_2Cl_5$) with the aid of the apparatus described in example 1.

An enclosure (10) was manufactured having a useful volume of 1.2 $m^3$, a diameter of 0.9 m and a height of 2 m. Its inner surface was coated with a silicon carbide lining. It was filled with spherical graphite balls covered with silicon carbide (thickness 0.2 mm). These balls had different diameters (40 and 20 mm) in order to reduce pressure drops and facilitate filling and with roughly the same number of 40 mm balls as 20 mm balls. Such a charge has a contact surface of approximately 80 $m^2$ for a pile of 1.2 $m^3$, i.e. approximately 65 $m^2/m^3$.

The enclosure (10) and its charge of balls (11) was heated by induction with the aid of a solenoid and a 100 kW generator operating under 3 kHz. Under conditions stabilized to 1500° C. (temperature of the balls), the consumption was 30 kW. This enclosure was supplied with a gaseous PCB flow with a flow rate of 430 kg/h. At the catcher were recovered 190 kg/h of carbon constituting the said solid product (8) and 241 kg/h of HCl constituting the gaseous product (9). Carbon recovery was brought about by circulating all the balls roughly three times per hour. The HCl was fed into an exchanger absorber (type GM of Carbone-Lorraine) in order to produce 33% concentrated hydrochloric acid, HCl absorption ensuring the circulation of the fluid flows (gaseous products and effluents) in the pyrolysis enclosure (10).

EXAMPLE 4

Figure 5:
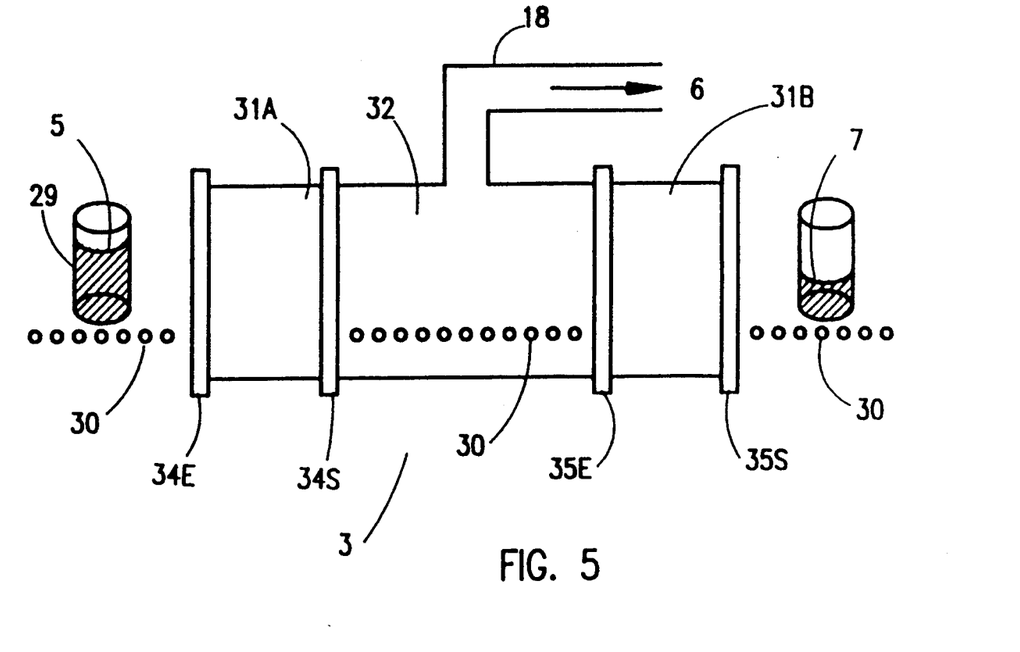
FIG. 5 shows in longitudinal section a gasification apparatus (3) for effluents in drums equipped with a gasification chamber (32) and two locks, namely an intake lock (31A) and a discharge lock (31B).
Figure 6:
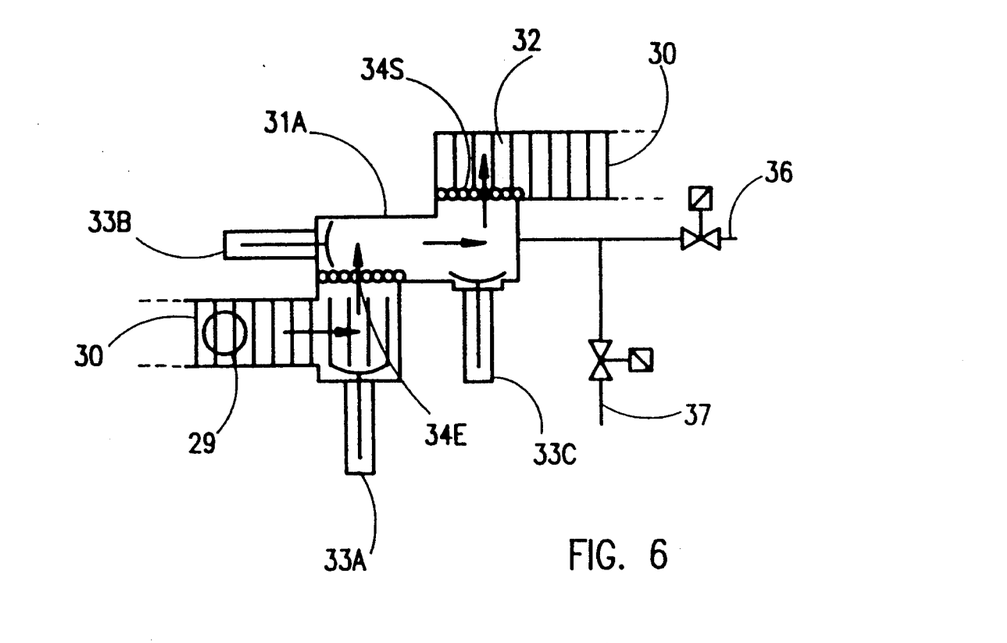
FIG. 6 is a cross-sectional view of the intake lock (31A) isolated by two doors (34), in which the drums (29) are displaced with the aid of jacks (33A, 33B, 33C) and which can be placed under a given atmosphere by means of a vacuum intake (36) and a gas feed pipe (37).

This example provides a description of a gasification device (3), as illustrated in FIGS. 5 and 6, used for supplying fluid effluent (6) to the pyrolysis apparatus (2) according to the invention.

The Applicant has developed a gasification device for effluents (5) packed in metal drums (29) and which has means for displacing said drums, diagrammatically illustrated in FIGS. 5 and 6 by motor rollers (30), a gasification chamber (32) provided with heating means (not shown in FIG. 5) heating the effluent charge to be treated to between 500° and 650° C., a discharge pipe (18) for the fluid effluents (6) and two locks, namely an intake lock (31A) and a discharge (31B), so as to carry out gasification under a controlled atmosphere and in particular protected from air. On leaving the gasification chamber, the solid residues (7) are recovered in the drums (29).

FIG. 5 is a general diagram, whereas FIG. 6 shows in detail the operation of a lock, namely the intake lock (31A). Each lock has an entrance door (34E, 35E) and an exit door (34S, 35S), the displacements of the drums in the lock being ensured by jacks (33A, 33B, 33C). Each lock is equipped with a vacuum intake (36) and an inert gas supply (37), generally in the form of nitrogen, so as to ensure the control of the gaseous atmosphere in each lock.

EXAMPLE 5

The complete unit is diagrammatically illustrated in FIG. 7, where the encircled references designate the materials and the non-encircled references apparatuses or equipment.

In this example a description is given of a complete pyrolysis unit (1) for the treatment of chlorinated residues (PCB) comprising the installation in series of a gasification device (3), as described in example 4, a pyrolysis apparatus (2), as described in example 1, and the commercially available HCl exchanger absorber (4) supplied with water (40) and supplying concentrated hydrochloric acid (42) and superheated steam (41).

EXAMPLE 6

This example differs from example 3 only with respect to the following points:

use is made of diameter 80 mm balls (instead of diameter 40 mm balls in example 3);

this led to a contact surface of 60 m$^2$ instead of 80 m$^2$ in example 3, i.e. approximately 50 m$^2$ of surface per m$^3$ (instead of 65 in example 3);

use was made of a 100 kW generator operating under 6 kHz (instead of 3 kHz in example 3).

Thus, the results obtained were comparable to those of example 3.

EXAMPLE 7

The distribution of the temperature of the graphite balls was studied in a concrete enclosure (10) heated by induction (in the absence of any pyrolysis reaction). For this purpose, use was made of 630 60 mm diameter balls (pack-cemented graphite balls), which were piled into a diameter 50 cm and overall height 100 cm concrete enclosure. The pile was covered with a mineral wool layer.

At different locations of the pile of balls were positioned balls equipped with thermocouples (1 mm chromel-alumel thermocouples positioned within the balls), so as to obtain in real time the temperature rise and temperature distribution within the enclosure. The enclosure was heated with a 60 kW induction coil with a frequency of 8.4 kHz. Throughout the test, a slight nitrogen flow was maintained (inadequate to have any significant action on the temperature).

The balls were heated to about 1000° C. in 45 min., with an average speed of rise of 1333° C./h and a maximum speed of 1800° C./h between 150° and 600° C. The temperature of the thermocouple-equipped ball located in the centre of the pile was taken, this constituting the highest temperature and was used as the reference temperature (temperature 990° C.). This central ball is in the central reference plane and on the central reference axis. There was a maximum variation of 200° C. between the two balls located on the same vertical axis, one being located in the reference plane and the other in the horizontal plane of the top of the pile. There was a maximum variation of 160° C. between two balls located in the same horizontal plane, one being on the central axis and the other on the periphery of the enclosure.

Complimentary tests revealed that in the case of a real pyrolysis, these temperature variations were significantly reduced.

Advantages of the Invention

On firstly comparing the process according to the invention and a PCB incineration process according to the prior art, per kg of treated PCB we obtain:

|  | prior art (incineration) | according to the invention |
|---|---|---|
| HCl | 15 moles | 15 moles |
| CO$_2$ | 37 moles | (0) |
| N$_2$ | 122 moles | (0) |

These CO$_2$ and N$_2$ variations have two consequences. On the one hand, the volume of gaseous products to be absorbed passing out of the pyrolysis apparatus was 13 times higher with the prior art process than with that according to the invention, so that the volume of the exchanger absorber necessary and therefore the costs of the equipment will be in a ratio of 13:3 on the basis of proven ratios known in chemical engineering. On the other hand, the process according to the invention does not lead to CO$_2$ formation.

The invention leads to numerous technical and economic advantages, namely a considerable compactness of the pyrolysis apparatus and therefore low investment costs, considerable flexibility and variety of operation, low operating costs (high energy efficiency, little or no consumable materials, automatable process).

The process and apparatuses according to the invention are used with advantage for the destruction of chlorinated effluents.

What is claimed is:

1. Process for the pyrolysis of fluid effluent, comprising:

providing a pyrolysis chamber containing a bed of solid elements having a contact surface of at least 10 $m^2/m^3$ and at least one electrically conductive portion;

heating said solid elements by induction within said chamber to a temperature sufficient for pyrolysis of said effluent;

passing said effluent through said bed of heated solid elements, thus causing pyrolysis of said effluent and production of a gaseous pyrolysis product and a solid pyrolysis product which is trapped on the contact surface of the solid elements;

removing the trapped solid pyrolysis product from the solid elements to regenerate said elements; and discharging the solid and gaseous pyrolysis products from the chamber.

2. Process according to claim 1, wherein each solid element is made from two different materials, one being an electrically conductive material which forms the central core of said solid element and the other a refractory material forming an outer layer covering said core.

3. Process according to claim 1, wherein said solid element is made from a single electrically conductive material.

4. Process according to claim 2, wherein said electrically conductive material is selected from the group consisting of graphite, refractory metals, conductive ceramic carbides, conductive ceramic silicides and conductive ceramic borides of metals.

5. Process according to claim 2, wherein said refractory material is selected from the group consisting of graphite, refractory metals, and conductive or insulating ceramic oxides, carbides, nitrides, silicides or borides of metals.

6. Process according to claim 1, wherein said solid elements are in the form of balls with a diameter between 10 and 150 mm.

7. Process according to claim 2, wherein the solid elements are shaped like a ball with a central graphite core and a refractory silicon carbide layer forming a covering and having a thickness between 0.1 and 2 mm.

8. Process according to claim 1, wherein said chamber is tubular and made from a refractory material selected from the group consisting of silicon carbide, alumina, reinforced alumina, carbon-carbon composites coated with silicon carbide and concrete.

9. Process according to claim 1, wherein said solid elements are fixed and form a fixed bed in said chamber during the pyrolysis.

10. Process according to claim 9, wherein two chambers are provided and used in alternating manner, so as to eliminate said solid products deposited on said solid elements from a first stationary chamber, while a second chamber is operating.

11. Process according to claim 1, wherein, said solid elements are mobile and form a bed of constant volume in said chamber during pyrolysis.

12. Process according to claim 11, wherein are introduced into said enclosure at one end of the bed and removed at the other end of said bed solid elements charged with said solid products, so as to ensure that the solid elements have a predetermined average residence time in said chamber.

13. Process according to claim 1, wherein an additional gas or non-oxidizing vapor is introduced into the chamber.

14. Process according to claim 1, wherein said fluid effluent is an organochlorine compound containing C, H and Cl, wherein said solid product comprises carbon and wherein said gaseous product comprises HCl.

15. Process according to claim 1, wherein said pyrolysis temperature is between 600° and 2600° C.

16. Process according to claim 3, wherein said electrically conductive material is selected from the group consisting of graphite, refractory metals, conductive ceramic carbides, conductive ceramic silicides and conductive ceramic borides.

* * * * *